June 2, 1970     I. S. SHAH     3,515,200

PROCESS FOR TREATMENT OF PULPING WASTE LIQUOR

Filed April 23, 1968     2 Sheets-Sheet 1

INDRAVADAN S. SHAH
INVENTOR.

BY *J. T. Chakraborty,*
AGENT

United States Patent Office 3,515,200
Patented June 2, 1970

3,515,200
PROCESS FOR TREATMENT OF PULPING WASTE LIQUOR
Indravadan S. Shah, Forest Hills, N.Y., assignor to Chemical Construction Corporation, New York, N.Y., a corporation of Delaware
Filed Apr. 23, 1968, Ser. No. 723,397
Int. Cl. B01d 1/14, 1/18
U.S. Cl. 159—47                                11 Claims

ABSTRACT OF THE DISCLOSURE

Dilute waste liquor derived from a wood pulp process is concentrated in two stages to produce a desired concentration liquor which is burned in a reactor to produce a solid product and hot flue gas. This efficient and more economical process converts the liquid waste effluent from the pulping process to water vapor and carbon dioxide, together with a solid product, and thus eliminates both water and air pollution. The initial stage of dilute liquor concentration is by direct contact with a hot gaseous stream, which may consist of preheated air, a mixture of preheated air and steam or reheated flue gas. The final stage of liquor concentration is by direct contact with the hot flue gas stream generated by the reactor, and the dust or entrained solid particles in the flue gas is simultaneously recovered by scrubbing.

BACKGROUND OF THE INVENTION

Field of the invention

Figure 1:
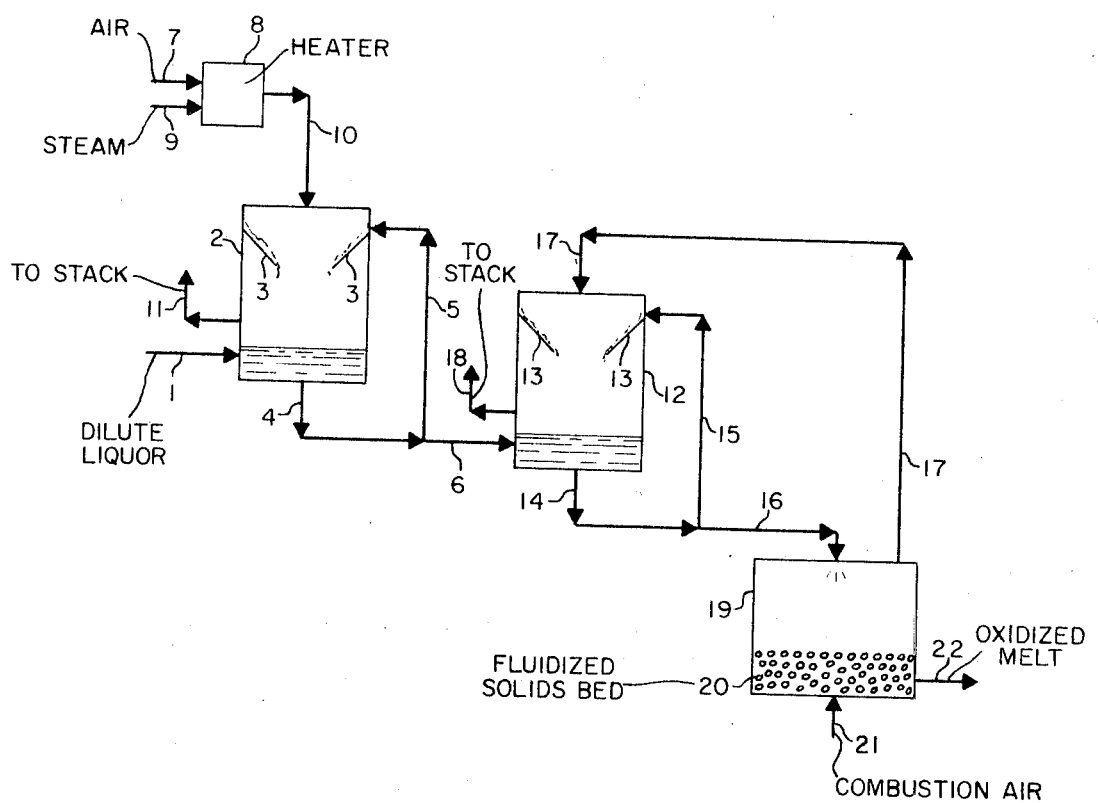

The invention relates to the processing of waste liquor, which is produced during the pulping process, and the recovery of valuable salts from the liquor.

Description of the prior art

The provision of a fluid bed reactor for the conversion of black liquor to solid salts or a smelt is described in U.S. Pats. Nos. 2,568,239; 2,755,749; 2,928,184; 3,309,262 and 3,322,492. The concept and apparatus for the direct contact of black liquor with hot flue gas derived from black liquor combustion, in order to concentrate the black liquor, is shown in U.S. Pats. Nos. 2,258,467; 2,590,905; 2,980,179; 3,183,145; 3,299,942 and 3,324,632. Other disclosures relative to the evaporation of black liquor and the recovery of solid salts and chemicals from the black liquor include U.S. Pats. Nos. 2,786,518, 2,840,454; 2,888,982; 3,176,756; 3,179,159 and 3,323,858.

In the existing processes, the weak waste liquor from a wood pulp mill, typically containing about 12.9% total solids content, is concentrated in multiple effect evaporators to a desired concentration of about 35% total solids. This concentrated liquor is then sprayed into the fluidized bed reactor, where it is evaporated and dried. The fluidizing air is typically at about 2 kg./sq. cm. pressure. The solid product is then transferred to storage, or redissolved in aqueous solution to produce a digestion liquor. The hot flue gas from the reactor, which contains entrained solid dust particles, is passed through dry cyclones, in which entrained dust is separated, collected and recycled to the reactor. The flue gases are then further scrubbed in primary and secondary scrubbers. In this prior art pocedure, the major cost is for the multiple effect evaporators, cyclones and primary and secondary scrubbers. In addition, the heat content of the flue gas is not properly reused. The process also requires steam for weak liquor evaporation in the multiple effect evaporators.

SUMMARY OF THE INVENTION

In the present invention, the weak waste liquor derived from a wood pulp mill at typically 12.9% total solids concentration is concentrated to typically 15.85% total solids concentration in a first direct contact evaporator, which may be a venturi type, casade type or the like. The hot gases required for evaporation can constitute preheated air alone, a mixture of air and steam, or reheated flue gas which has been previously employed to produce highly concentrated black liquor in a second direct contact evaporator. In one embodiment of the invention, ambient air or a mixture of ambient air and available steam are heated in a heater to a proper temperature, and the hot gaseous stream is used for evaporation in the first direct contact evaporator. The bleed from this evaporator is added as a makeup stream to the second direct contact evaporator, which is typically an evaporator-scrubber in which the hot flue gases leaving the chemical reactor are used as an evaporation medium. A simultaneous scrubbing of dust from the hot flue gases is also achieved in the evaporator scrubber. The product from this unit is typically at about 35% total solids concentration, and is then fired in the chemical reactor. In one embodiment of the invention, the scrubbing of the flue gas is carried out in two evaporators in series. The flue gases leaving the initial evaporator-scrubber typically at 80° C. are passed through a heater and heated to a desired temperature. This reheated flue gas is then reused in a second evaporator-scrubber for concentration of weak liquor, typically from 12.9% total solids to 18.6% total solids. In this manner, a two stage system is formed, with the liquor and flue gas passing countercurrently through the two stages in series, together with reheating of the flue gas between stages.

A principal advantage of the invention is that the equipment of the prior art, including multiple effect evaporators, cyclones and primary and secondary scrubbers, is eliminated and replaced by more efficient and less costly equipment. In addition, the flue gas heat is utilized most efficiently. In summary, in the present invention the operating costs are much lower than in the existing processes. Equipment cost and space requirement are comparatively very low in the present invention. Finally, the steam requirement for the multiple effect evaporators of the prior art is now eliminated.

It is an object of the present invention to provide an improved process for the concentration and utilization of waste liquor from a wood pulping process.

Another object is to provide a process for two stage concentration of weak or dilute liquor.

An additional object is to utilize the hot flue gas generated by combustion of concentrated liquor for concentration of weak liquor.

A further object is to provide a more efficient and less costly process for the concentration of weak liquor.

Still another object is to provide a process for the recovery of valuable salts from liquor.

These and other objects and advantages of the present invention will become evident from the description which follows.

DESCRIPTION OF THE DRAWINGS AND PREFERRED EMBODIMENTS

Figure 2:
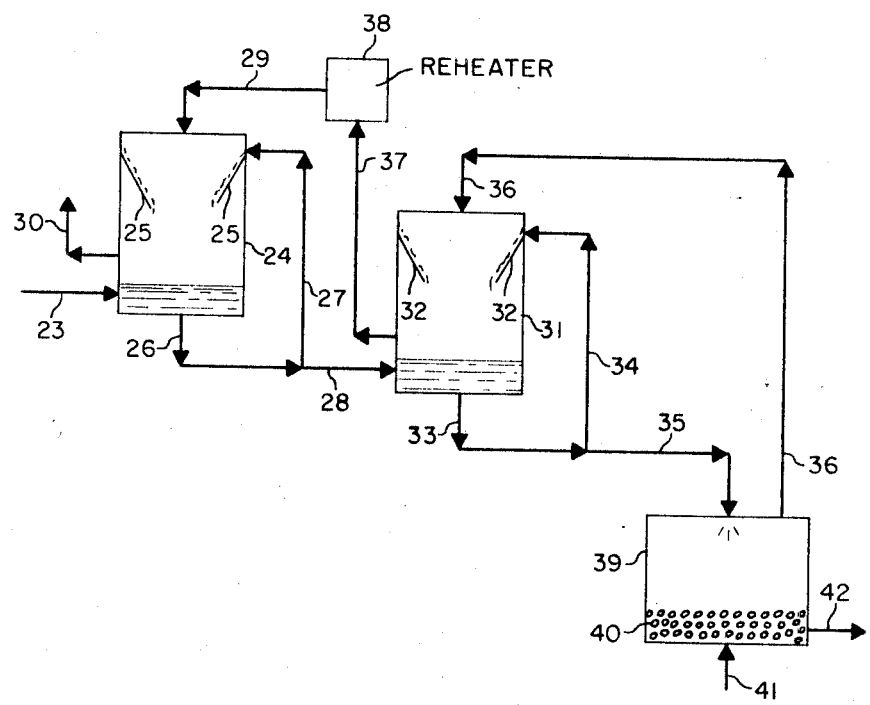

Referring to the drawings, FIG. 1 is a flowsheet of one embodiment of the invention, in which initial concentration of the weak liquor is carried out by direct contact with preheated air, and FIG. 2 is a flowsheet of an alternative embodiment of the invention, in which concentration of the weak liquor is carried out in two stages by direct contact with hot flue gas, and the flue gas is reheated between stages.

Referring now to FIG. 1, weak or dilute liquid stream 1, which is typically derived from a neutral sulfite semichemical (NSSC) wood pulp process or other wood pulp digestion process, and which typically contains in the range of about 7% to 12% total dissolved solids content by weight, is passed into the body of partially concentrated liquor in the lower part of evaporator 2. The evaporator 2 may consist of any suitable gas-liquid contact means, however unit 2 will preferably consist of a venturi contactor, which is provided with an internal inverted frusto-conical baffle 3 for concentrated gas-liquid contact. A stream 4 consisting of partially concentrated liquor, which typically contains in the range of 14% to 25% total solids content, is withdrawn from the bottom of unit 2 and is divided into a major portion stream 5 which is recycled, and bleed stream 6 which is passed to further processing as will appear infra. Stream 5 is recycled into unit 2 above baffle 3, and flows downwards on the upper surface of baffle 3 as a liquid film.

An ambient air stream 7 is passed into heater 8, and in most instances an optional steam stream 9 is passed into unit 8 together with stream 7, in order to provide a further heating effect while modulating the evaporation rate in unit 2. The streams 7 and 9 are mixed and heated in unit 8, and the resulting hot air stream 10 containing water vapor is produced at a temperature typically in the range of 200° C. to 600° C. Stream 10 is passed into the upper portion of unit 2 above baffle 3, and is diverted and accelerated into a high velocity flow rate by flowing downwards adjacent to the converging side walls of baffle 3. The hot air and downflowing liquor film are mixed at the lower outlet opening of baffle 3, with the liquor phase being dispersed into droplets by contact with the highly accelerated air stream. A rapid gas-liquid contact equilibrium is attained, with resultant evaporation of a portion of the water content of the liquor phase into the air stream. The highly humidified air is removed from the lower portion of unit 2 below baffle 3 via stream 11, which is discharged to atmosphere via a stack or otherwise suitably disposed.

Bleed partially concentrated liquor stream 6 is passed into the body of fully concentrated liquor in the lower part of evaporator-scrubber 12. The evaporator 12 may consist of any suitable gas-liquid contact means, however unit 12 will preferably consist of a venturi contactor similar to unit 2, and is provided with an internal inverted frusto-conical baffle 13 for concentrated gas-liquid contact. A stream 14 consisting of fully concentrated liquor, which typically contains in the range of 30% to 60% total solids content, is withdrawn from the bottom of unit 12 and is divided into a major portion stream 15 which is recycled, and bleed stream 16 which is passed to further processing as will appear infra. Stream 15 is recycled into unit 12 above baffle 13, and flows downwards on the upper surface of baffle 13 as a liquid film.

A hot flue gas stream 17 is passed into unit 12 above baffle 13. Stream 17 is derived from liquor combustion as will appear infra, and in most instances stream 17 is typically at a temperature in the range of 400° C. to 800° C. and contains entrained dust consisting of solid salt particles. The flue gas stream 17 is diverted and accelerated into a high velocity of flow rate by flowing downwards adjacent to the converging side walls of baffle 13. The hot flue gas and downflowing liquor film are mixed at the lower outlet opening of baffle 13, with the liquor phase being dispersed into droplets by contact with the highly accelerated flue gas stream. A rapid gas-liquid contact equilibrium is attained, with resultant evaporation of a portion of the water content of the liquor phase into the flue gas stream and dissolving or entraining of at least a portion of the flue gas dust in the liquid phase. The highly humidified flue gas is removed from the lower portion of unit 12 below baffle 13 via stream 18, which is discharged to atmosphere via a stack or otherwise suitably disposed.

Bleed, fully concentrated, liquor stream 16 is now passed or sprayed into chemical reactor 19 for combustion with air. Unit 19 is typically a fluidized bed reactor, with a lower bed 20 consisting of discrete solid particles being maintained in fluid or ebullient motion by passing combustion air stream 21 into the bottom of unit 19. A lower perforated plate or grate, not shown, may be provided in unit 19 to support the bed 20 during quiescent intervals of the operating period. Fully oxidized solid smelt is removed from unit 19 via stream 22, which consists mostly of sodium sulfate and sodium carbonate.

Referring now to FIG. 2, an alternative embodiment of the invention is presented, in which both stages of evaporative concentration of liquor are carried out in evaporator-scrubbers which utilize flue gas as the evaporation medum. A weak or dilute liquor stream 23 which is typically derived from a neutral sulfite semi-chemical (NSSC) wood pulp process or other wood pulp digestion process, and which typically contains in the range of about 7% to 12% total dissolved solids content by weight, is passed into the body of partially concentrated liquor in the lower part of evaporator-scrubber 24. The evaporator 24 may consist of any suitable gas-liquid contact means, however unit 24 will preferably consist of a venturi contactor, which is provided with an internal inverted frusto-conical baffle 25 for concentrated gas-liquid contact. A stream 26 consisting of partially concentrated liquor, which typically contains in the range of 14% to 25% total solids content, is withdrawn from the bottom of unit 24 and is divided into a major portion stream 27 which is recycled, and bleed stream 28 which is passed to further processing as will appear infra. Stream 27 is recycled into unit 24 above baffle 25, and flows downwards on the upper surface of baffle 25 as a liquid film.

A reheated and hot flue gas stream 29, which is produced at a temperature typically in the range of 200° C. to 600° C. as will be described infra and contains water vapor derived from the previous evaporative concentration of liquor as well as entrained dust particles, is passed into the upper portion of unit 24 above baffle 25, and is diverted and accelerated into a high velocity flow rate by flowing downwards adjacent to the converging side walls of baffle 25. The hot flue gas and downflowing liquor film are mixed at the lower outlet opening of baffle 25, with the liquor phase being dispersed into droplets by contact with the highly accelerated flue gas stream. A rapid gas-liquid contact equilibrium is attained, with resultant evaporation of a portion of the water content of the liquor phase into the flue gas stream, and in addition dust contained in stream 29 is dissolved or entrained in the liquid phase. The highly humidified flue gas is removed from the lower portion of unit 24 below baffle 25 via stream 30, which is discharged to atmosphere via a stack or otherwise suitably disposed.

Bleed, partially concentrated, liquor stream 28 is passed into the body of fully concentrated liquor in the lower part of evaporator-scrubber 31. The evaporator-scrubber 31 may consist of any suitable gas-liquid contact means, however unit 31 will preferably consist of a venturi contactor similar to unit 24, and is provided with an internal inverted frusto-conical baffle 32 for concentrated gas-liquid contact. A stream 33 consisting of fully concentrated liquor, which typically contains in the range of 30% to 60% total solids content, is withdrawn from the bottom of unit 31 and is divided into a major portion stream 34 which is recycled, and bleed stream 35 which is passed to further processing as will appear infra. Stream 34 is recycled into unit 31 above baffle 32, and flows downwards on the upper surface of baffle 32, as a liquid film.

A hot flue gas stream 36 is passed into unit 31 above baffle 32. Stream 36 is derived from liquor combustion as will appear infra, and in most instances stream 36 is typically at a temperature in the range of 400° C. to 800° C. and contains entrained dust consisting of solid salts particles. The flue gas stream 36 is diverted and accelerated into a high velocity flow rate by flowing downwards adjacent to the converging side walls of baffle 32. The hot flue gas and downflowing liquor film are mixed at the lower outlet opening of baffle 32, with the liquid phase being dispersed into droplets by contact with the highly accelerated flue gas stream. A rapid gas-liquid contact equilibrium is attained, with resultant evaporation of a portion of the water content of the liquor phase into the flue gas stream and a dissolving or entrainment of at least a portion of the flue gas dust in the liquid phase. The humidified flue gas is removed from the lower portion of unit 31 below baffle 32 via stream 37, which is reheated in heater 38 to a temperature typically in the range of 200° C. to 600° C. and discharged as stream 27, which is utilized as described supra.

Bleed fully concentrated liquor stream 35 is now passed or sprayed into chemical reactor 39 for combustion with air. Unit 39 is typically a fluidized bed reactor, with a lower bed 40 consisting of discrete solid particles being maintained in fluid or ebullient motion by passing combustion air stream 41 into the bottom of unit 39. A lower perforated plate or grate, not shown, may be provided in unit 39 to support the bed 40 during quiescent intervals of the operating period. Fully oxidized solid smelt is removed from unit 39 via stream 42, which consists mostly of sodium sulfate and sodium carbonate.

Numerous alternatives within the scope of the present invention will occur to those skilled in the art, besides those alternatives and variations mentioned supra. The ranges of process variables such as temperature and dissolved solids content of the liquor at various stages of the process constitute preferred embodiments of the invention for optimum utilization of the process, and the invention may be practiced outside of these ranges in suitable instances. Stream 9 may be omitted in some cases, particularly when stream 1 is relatively very weak or dilute. Other types of gas-liquid contactors may be employed in the process, instead of the venturi contactors 2, 12, 24 and 31. Other suitable types of contactors include cascade contactors, tray towers, or simple open spray towers. Concentration of weak liquor is preferably achieved in two stages, but more or less than two stages could be utilized.

Examples of industrial application of the process will now be described.

EXAMPLE I

The process of the present invention as embodied in FIG. 1 was applied to the processing of a weak liquor derived from a neutral sulfite semi-chemical (NSSC) wood pulp process. Following is data relative to principal process streams.

| Stream No. | Temp., °C. | Specific gravity | Relative humidity | Component flow rate, kg./ | | |
|---|---|---|---|---|---|---|
| | | | | Solids | Water | Dry gas |
| 1 | 70 | 1.04 | | 104 | 701 | |
| 6 | 82 | | | 104 | 517 | |
| 7 | Amb. | | | | | 530 |
| 9 | | | | | 192 | |
| 10 | 536 | | .363 | | 192 | 530 |
| 11 | 82 | | .721 | | | |
| 16 | 91 | 1.2 | | 134 | 248 | |
| 17 | 536 | | .363 | 30 | 273 | 752 |
| 18 | 82 | | .721 | | 542 | 752 |
| 21 | | | | | | 720 |

EXAMPLE II

The process of the present invention as embodied in FIG. 2 was applied to the processing of a weak liquor derived from a neutral sulfite semi-chemical wood (NSSC) pulp process. Following is data relative to principal process streams.

| Stream No. | Temp., °C. | Specific gravity | Relative humidity | Component flow rate, kg./ | | |
|---|---|---|---|---|---|---|
| | | | | Solids | Water | Dry gas |
| 23 | 70 | 1.04 | | 104 | 701 | |
| 28 | 85 | | | 119 | 517 | |
| 29 | 270 | | .721 | 15 | 542 | 752 |
| 30 | 85 | | .914 | 0.3 | 726 | 752 |
| 35 | 91 | 1.2 | | 135 | 248 | |
| 36 | 536 | | .363 | 30 | 273 | 752 |
| 37 | 82 | | .721 | 15 | 542 | 752 |
| 41 | | | | | | 720 |

I claim:
1. A process for producing a solid smelt from dilute waste liquor derived from a wood pulp process which comprises contacting a dilute liquor stream with a hot gaseous stream consisting of preheated air free of combustion products, whereby water is evaporated from said dilute liquor stream into said preheated air stream and a partially concentrated liquor stream is produced; contacting said partially concentrated liquor stream with a hot flue gas stream, whereby water is evaporated from said partially concentrated liquor stream into said hot flue gas stream and a fully concentrated liquor stream is produced, burning said fully concentrated liquor stream by reaction with air at elevated temperature in a reactor, whereby a solid smelt is produced in said reactor and said hot flue gas stream is generated, passing said generated hot flue gas stream to said contact with said partially concentrated liquor stream, and recovering solid smelt from said reactor.

2. The process of claim 1, in which said hot gaseous stream free of combustion products comprises a mixture of preheated air and steam.

3. The process of claim 1, in which said hot flue gas stream contains entrained solid particles, and at least a portion of said entrained solid particles is dissolved in said fully concentrated liquor stream.

4. The process of claim 1, in which said hot gaseous stream comprising preheated air free of combustion products is at an initial temperature in the range of 200° C. to 600° C. and said hot flue gas stream is at an initial temperature in the range of 400° C. to 800° C.

5. The process of claim 1, in which said dilute liquor stream contains in the range of 7% to 12% total solids, said partially concentrated liquor stream contains in the range of 14% to 25% total solids, and said fully concentrated liquor stream contains in the range of 30% to 60% total solids.

6. The process of claim 1, in which said reactor is a fluidized bed reactor.

7. The process of claim 1, in which said dilute liquor stream is derived from a neutral sulfite semi-chemical wood pulp process.

8. A process for producing a solid smelt from dilute waste liquor derived from a wood pulp process which comprises contacting a dilute liquor stream with a hot reheated flue gas stream, whereby water is evaporated from said dilute liquor stream into said reheated flue gas stream and a partially concentrated liquor stream is produced, contacting said partially concentrated liquor stream with a hot flue gas stream derived from liquor combustion, whereby water is evaporated from said partially concentrated liquor stream into said flue gas stream and a fully concentrated liquor stream and a cooled flue gas stream are produced, reheating said cooled flue gas stream to form said hot reheated flue gas stream, burning said fully concentrated liquor stream by reaction with air at elevated temperature in a reactor, whereby a solid smelt is produced in said reactor and said hot flue gas stream is generated, passing said generated hot flue gas stream to said contact with said partially concentrated liquor stream, and recovering solid smelt from said reactor.

9. The process of claim 8, in which said cooled flue gas stream is reheated to form said hot reheated flue gas stream at a temperature in the range of 200° C. to 600° C., and said hot flue gas stream formed by combustion of said fully concentrated liquor stream is at an initial temperature in the range of 400° C. to 800° C.

10. A process for producing a solid smelt from dilute waste liquor derived from a wood pulp process which comprises contacting a dilute liquor stream with a hot gaseous stream comprising preheated air free of combustion products and steam, whereby water is evaporated from said dilute liquor stream into said preheated air-steam stream and a partially concentrated liquor stream is produced, contacting said partially concentrated liquor stream with a hot flue gas stream, whereby water is evaporated from said partially concentrated liquor stream into said hot flue gas stream and a fully concentrated liquor stream is produced, burning said fully concentrated liquor stream by reaction with air at elevated temperature in a reactor, whereby a solid smelt is produced in said reactor and said hot flue gas stream is generated, passing said generated hot flue gas stream to said contact with said partially concentrated liquor stream, and recovering solid smelt from said reactor.

11. The process of claim 10, in which said hot gaseous stream comprising preheated air and steam is at an initial temperature in the range fo 200° C. to 600° C., and said hot flue gas stream is at an initial temperature in the range of 400° C. to 800° C.

References Cited

UNITED STATES PATENTS

| 2,303,811 | 12/1942 | Gadenhausen | 23—162 |
| 2,755,749 | 7/1956 | Seymour | 110—7 |
| 2,936,215 | 5/1960 | Hochmuth | 23—48 |
| 3,299,942 | 1/1967 | Jacoby. | |
| 3,439,724 | 4/1969 | Mason. | |

FOREIGN PATENTS 196,084   5/1957   Sweden.

OTHER REFERENCES

Chemical Week, vol. 97, No. 5, July 31, 1965, p. 31.

NORMAN YUDKOFF, Primary Examiner

J. SOFER, Assistant Examiner

U.S. Cl. X.R.

159—13, 16; 162—30